Figure 1:
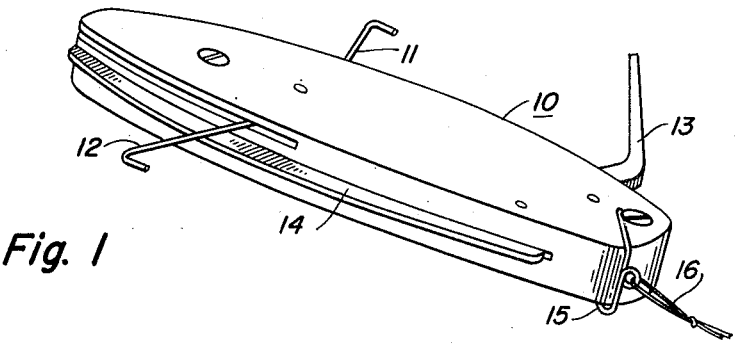

Oct. 30, 1956      H. U. SPENCE      2,768,463

FISH LURE

Filed March 21, 1955

INVENTOR.
HENRY U. SPENCE
BY Fay & Fay
ATTORNEYS

United States Patent Office 2,768,463
Patented Oct. 30, 1956

2,768,463

FISH LURE

Henry U. Spence, Painesville, Ohio, assignor to Upson Machine Products, Inc., Painesville, Ohio, a corporation of Ohio Application March 21, 1955, Serial No. 495,709

1 Claim. (Cl. 43—36)

This invention relates, as indicated, to a fish lure comprising a combination of a trigger bar, snatch hooks, and operating lever, together with the ornamental appearance decoration, leaders, and attachments for said lure, said lure comprising a combination without apparent hooks, having hooks operated internally by the trigger bar, and including in combination with said trigger bar and snatch hooks an operating lever for retracting the hooks to permit the return of a fish to the water for any reason whatsoever.

An object of this invention is to produce a new and simplified combination of snatch hooks which are operated by a pivoted trigger bar having in combination therewith an operating lever for retracting said hooks.

A further object of this invention is to produce an improved combination of an unbarbed hook with operating and resilient spring mounting means therefor.

To the accomplishment of the foregoing and related ends, said invention, then, consists of the fish lure and means hereinafter fully described and pointed out in the claim, the following description setting forth in detail one approved means of carrying out the invention, such disclosed means, however, constituting but one of the various ways in which the principles of this invention may be used.

Figure 2:
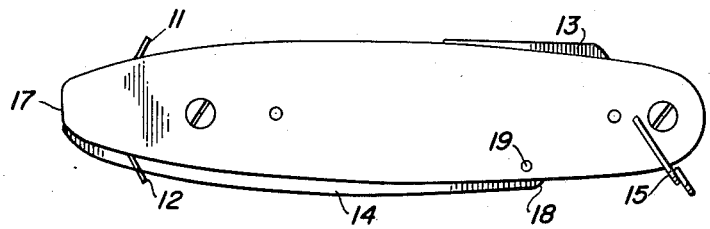
Figures 3, 5:
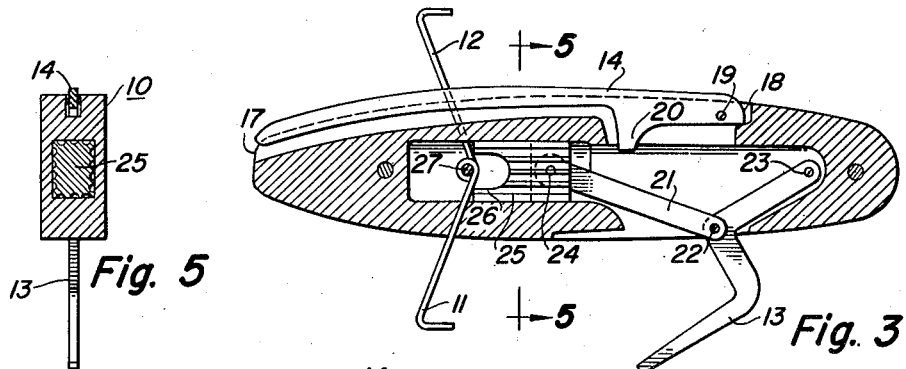
Figure 4:
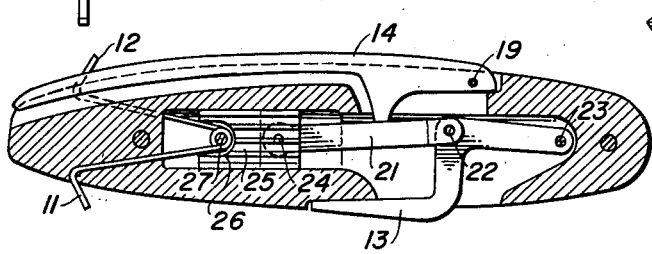

In the drawings:

Fig. 1 is a perspective view of the lure in open position, showing a leader and an attachment, Fig. 2 is a closed view, left side, showing the hooks and the operating lever as well as the trigger bar, Fig. 3 is a cross-sectional view longitudinally of the lure, showing the hooks in open position, Fig. 4 is a cross-sectional view of the lure in closed position, showing the organization of elements, and Fig. 5 is a cross-sectional view of the lure showing a fluted slide member.

In the drawings, 10 shows a fish lure with a body portion having hooks 11 and 12, said hooks being unbarbed, said lure having an operating lever 13 and a trigger bar 14. Means associated with the lure for attachment to a line include a pivoted assembly 15, and a leader 16. Interiorly of the body of the fish lure is an elongated recess in which are located the parts above mentioned and from this recess are a number of longitudinal slots through which the unbarbed hooks are resiliently urged.

In Fig. 2 the trigger bar may be seen more clearly extending from the rear of the fish lure, near the tail, at 17 to a point beyond the mid-position of the lure indicated at 18, having a pivoted point shown approximately at 19, upon which said trigger bar pivots. Pressure, as indicated, on any portion of the rear of the fish lure will cause the trigger bar to force the hooks 11 and 12 outwardly therefrom. Retracting lever 13 is adapted to retract the hooks and to drop the fish off the hooks.

Fig. 3 shows the assembly in detail with a longitudinal cross-sectional view through the lure. Component parts as shown in this picture are the trigger bar 14, pivoted at 19, and extending to the rear of the lure, said trigger bar having an inwardly projecting arm 20 adapted to contact link 21. Link 21 is connected at pivot point 22 to the offset or stepped operating and retracting lever 13, said lever further being pivoted at the upper or head end of the lure, as shown at 23. This combination of link and retracting lever forms a toggle which is operated by the trigger bar and projecting arm 21. Said connecting link 21 is pivoted at 24 to a slide member 25, having a yoke or recess 26 that surrounds the resiliently mounted hooks 11 and 12. Said hooks are coiled around a rod 27 and said yoke 26 is adapted to compress the hooks within the confines of the fish lure, as is shown further in Fig. 4. Said operating lever and link are adapted to pass beyond the midpoint in order to catch and keep the hooks within the body of the lure. Of course, it will be seen that as soon as the trigger bar 14, pivoted at the pivot 19, pushes said link inwardly past dead center, that is, to one side of a line joining the two end pivot points of the link and lever, the hooks will spring out. Since there is quite a mechanical advantage, a light contact by the fish in swallowing the lure from below, as seen in Fig. 3, will catch the fish.

Further in operation it will be seen that the leader, being on top of the lure, will cause the trigger bar to remain away from the under side, which may contact objects in the water. In this way the trigger bar will not be triggered to catch the said objects and will flow freely through weeds, logs, and along the bottom, should this be the case. It is possible, though not as likely, for the lure to be triggered under these conditions.

It is also particularly safe for fishing in certain waters where the fish are undersized, as the fish may be readily removed, there being no chance that the fish will completely swallow the lures and the barbed hooks, which would necessitate killing the fish to remove the hooks in a great number of instances.

The above assembly of parts are seen more particularly in connection with Fig. 4 in the closed position. Actually the position of the hooks is somewhat exaggerated in this view and they normally do not extend outside of the body of the lure. Almost any ornamental appearance, coloring and combination may be used in connection with the lure to make it more attractive to the fish.

In Fig. 5 I have shown the slide 25 fluted because in sand or other material it is possible that dirt might jam the longitudinal movement of the slide and the ready movement of water through the lure will cause any entrapped sand to move outwardly therefrom to permit easy cleaning.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description of a fish lure and defined by the appended claim.

I claim:

A fish lure comprising a body portion having an elongated recess therein, at least one unbarbed hook mounted on the lure and within the recess, said body portion being provided with a longitudinal slot, said hook being resiliently urged in the said longitudinal slot in the lure in a direction outward of the lure, a trigger bar mounted at one end thereof for pivotal movement on the lure, a slide mounted for longitudinal sliding movement in the recess, and a link pivotally connected at its rear end to the front of the slide, a stepped retracting lever located within the recess of the lure and pivotally connected at its front portion thereto, the front end of the link being pivotally connected to an intermediate portion of the stepped retracting lever, the slide being provided at its rear end with a recess, the walls of which are adapted to engage the hook and hold it in set position substantially within the lure, the link and the front portion of the retracting lever constituting a toggle, the link and the said front portion of the retracting lever being oriented in set position in such manner that the pivot point therebetween is located above a line joining the two end pivot points of the link and lever, the intermediate portion of the trigger bar being provided with an inwardly extending projection such that on engagement of the trigger bar by the fish, the link will be so moved that the pivot point between it and the retracting lever will be displaced below the said line occasioning a forward movement of the slide and permitting the hook to be resiliently pivoted out from the body of the lure.

References Cited in the file of this patent

UNITED STATES PATENTS

| | | |
|---|---|---|
| 1,697,120 | Johns | Jan. 1, 1929 |
| 2,200,670 | Hargrett | May 14, 1940 |
| 2,491,546 | Barnett et al. | Dec. 20, 1949 |
| 2,550,376 | Peterson | Apr. 24, 1951 |